United States Patent
Park

(10) Patent No.: US 12,175,079 B2
(45) Date of Patent: Dec. 24, 2024

(54) MEMORY CONTROLLER FOR PROCESSING REQUESTS OF HOST AND STORAGE DEVICE INCLUDING THE SAME

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 107 days.

(21) Appl. No.: 18/076,034

(22) Filed: Dec. 6, 2022

(65) Prior Publication Data

US 2024/0012564 A1 Jan. 11, 2024

(30) Foreign Application Priority Data

Jul. 7, 2022 (KR) .................. 10-2022-0083825

(51) Int. Cl.
*G06F 3/06* (2006.01)

(52) U.S. Cl.
CPC ............ *G06F 3/061* (2013.01); *G06F 3/0629* (2013.01); *G06F 3/0679* (2013.01)

(58) Field of Classification Search
CPC ...... G06F 3/061; G06F 3/0629; G06F 3/0679; G06F 3/0658; G06F 3/0659; G06F 2212/1024
See application file for complete search history.

(56) References Cited

U.S. PATENT DOCUMENTS

| | | | |
|---|---|---|---|
| 2013/0031069 A1* | 1/2013 | Dudgeon | G06F 16/2365 707/704 |
| 2020/0073794 A1* | 3/2020 | Chen | G11C 16/102 |
| 2021/0110866 A1* | 4/2021 | Gopalakrishnan | G06F 12/0246 |

FOREIGN PATENT DOCUMENTS

| KR | 10-2020-0022192 A | 3/2020 |
|---|---|---|
| KR | 10-2020-0051387 A | 5/2020 |
| KR | 10-2021-0028517 A | 3/2021 |

* cited by examiner

*Primary Examiner* — Larry T MacKall
(74) *Attorney, Agent, or Firm* — IP & T GROUP LLP

(57) ABSTRACT

Provided herein may be a memory controller and a storage device including the same. The storage device may include a memory device including a plurality of memory cell arrays configured to store user data, a hardware accelerator configured to search for map data related to the user data, and a memory controller configured to control, in response to a first request received from a host, the memory device and the hardware accelerator to perform an operation corresponding to the first request, determine, when a second request is received from the host, whether the second request requires an operation of the hardware accelerator to transfer a dummy command to the hardware accelerator.

18 Claims, 8 Drawing Sheets

MEMORY CONTROLLER FOR PROCESSING REQUESTS OF HOST AND STORAGE DEVICE INCLUDING THE SAME

CROSS-REFERENCE TO RELATED APPLICATION

The present application claims priority under 35 U.S.C. § 119(a) to Korean patent application number 10-2022-0083825, filed on Jul. 7, 2022, the entire disclosure of which is incorporated herein by reference.

BACKGROUND

1. Field of Invention

Various embodiments of the present disclosure relate to an electronic device, and more particularly to a storage device including a memory device and a memory controller.

2. Description of Related Art

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The nonvolatile memory device may be a memory device in which stored data is retained even when power supply is interrupted. Examples of the nonvolatile memory device may include a read only memory (ROM), a programmable ROM (PROM), an electrically programmable ROM (EPROM), an electrically erasable and programmable ROM (EEPROM), and a flash memory.

A storage device may include separate hardware for assisting with an internal operation (e.g., a write operation or a read operation) if necessary. In particular, the storage device may include a map cache and a search engine for searching for map data and the like to increase a processing speed for the internal operation, and such hardware devices are referred to as 'hardware accelerators.' SUMMARY Various embodiments of the present disclosure are directed to a method of efficiently operating a storage device including a hardware accelerator and a controller that are asynchronously operated.

An embodiment of the present disclosure may provide for a storage device. The storage device may include a memory device including a plurality of memory cell arrays configured to store user data, a hardware accelerator configured to search for map data related to the user data, and a memory controller configured to control, in response to a first request received from a host, the memory device and the hardware accelerator to perform an operation corresponding to the first request, determine, when a second request is received from the host, determine whether the second request requires an operation of the hardware accelerator to transfer a dummy command to the hardware accelerator.

An embodiment of the present disclosure may provide for a memory controller. The memory controller may include a hardware accelerator configured to search for information about mapping between a logical address and a physical address, and an accelerator controller configured to control the hardware accelerator to perform an operation corresponding to a first request received from a host in response to the first request, determine, when a second request is received from the host, whether the second request requires an operation of the hardware accelerator to transfer a dummy command to the hardware accelerator.

An embodiment of the present disclosure may provide for a method of operating a storage device including a hardware accelerator and an accelerator controller. The method may include controlling, by the accelerator controller, when a first request is received from a host, the hardware accelerator in response to the first request, determining, by the accelerator controller, when a second request is received from the host, whether the second request needs to be processed after the first request, and determining, by the accelerator controller, whether the hardware accelerator is required to process the second request to transfer a dummy command to the hardware accelerator.

An embodiment of the present disclosure may provide for a device including an accelerator configured to provide responses sequentially in response to a series of respective acceleration commands by completing actual acceleration tasks for one or more actual acceleration commands within the series and without performing a dummy acceleration task for a dummy acceleration command within the series, and a controller configured to process sequentially a series of controller tasks, which include the actual and dummy acceleration tasks and self-tasks, by: providing the accelerator with the series of respective acceleration commands to receive the responses, completing the self-tasks, and completing the dummy acceleration task upon receiving the response to the dummy acceleration command.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in this specification.

Figure 1:
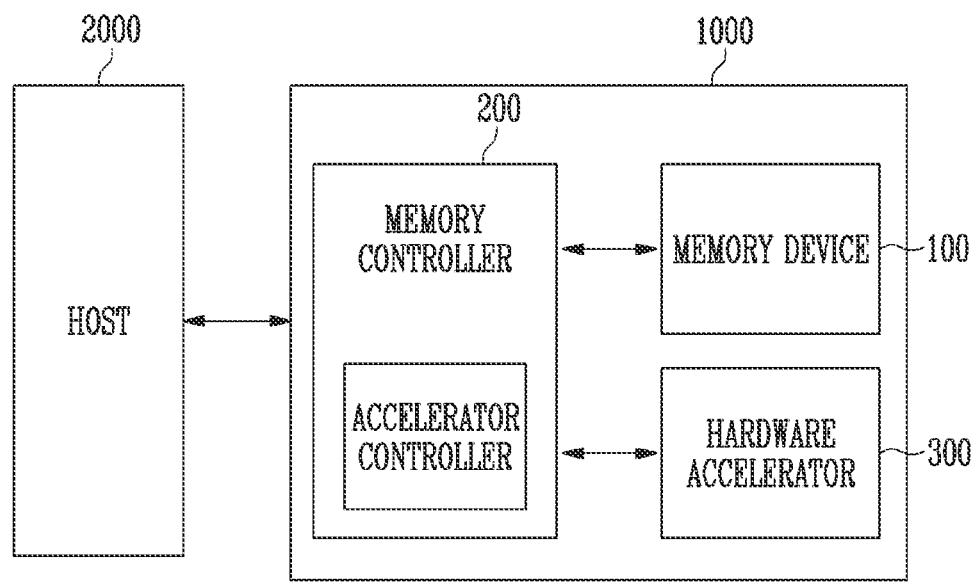
FIG. 1 is a block diagram illustrating a storage device according to an embodiment of the present disclosure.

FIG. 1 is a block diagram illustrating a storage device according to an embodiment of the present disclosure.

Referring to FIG. 1, a storage device 1000 may include a memory device 100, a memory controller 200, and a hardware accelerator 300.

The storage device 1000 may be a device which stores data under the control of a host 2000, such as a mobile phone, a smartphone, an MP3 player, a laptop computer, a desktop computer, a game console, a display device, a tablet PC, or an in-vehicle infotainment system.

The storage device 1000 may be implemented as any of various types of storage devices depending on a host interface that is a scheme for communication with the host 2000. For example, the storage device 1000 may be implemented as any of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 1000 may be implemented in any of various types of package forms. For example, the storage device 1000 may be implemented in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data or use the stored data. In detail, the memory device 100 may be operated in response to the control of the memory controller 200. Further, the memory device 100 may include a plurality of memory dies, each of which may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells, and one memory block may include a plurality of pages. Here, each page may be one unit by which data is stored in the memory device 100 or by which data stored in the memory device 100 is read.

The memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). For convenience of description, in the present specification, a description is made on that the memory device 100 is a NAND flash memory.

The memory device 100 may receive a command and an address from the memory controller 200. The memory device 100 may access an area, selected by the received address, in the memory cell array. Accessing the selected area may mean that an operation corresponding to the received command is performed on the selected area. For example, the memory device 100 may perform a write operation (i.e., a program operation), a read operation, and an erase operation. Here, the program operation may be an operation in which the memory device 100 writes data to an area selected by the address. The read operation may be an operation in which the memory device 100 reads data from an area selected by the address. The erase operation may be an operation in which the memory device 100 erases data stored in an area selected by the address.

The memory controller 200 may control the overall operation of the storage device 1000. In detail, when power is applied to the storage device 1000, the memory controller 200 may run firmware (FW). The firmware (FW) may include a host interface layer (HIL) which receives a request input from the host 2000 or outputs a response to the host 2000, a flash translation layer (FTL) which manages an operation between the interface of the host 2000 and the interface of the memory device 100, and a flash interface layer (FIL) which provides a command to the memory device 100 or receives a response from the memory device 100.

The memory controller 200 may receive data and a logical address (LA) from the host 2000, and may map the logical address to a physical address (PA) indicating the address of memory cells which are included in the memory device 100 and in which data is to be stored. The logical address may be a logical block address (LBA), and the physical address may be a physical block address (PBA).

The memory controller 200 may control the memory device 100 so that a program operation, a read operation or an erase operation is performed in response to a request received from the host 2000. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

The memory controller 200 may control the memory device 100 so that a program operation, a read operation or an erase operation is internally performed regardless of a request received from the host 2000. For example, the memory controller 200 may control the memory device 100 so that a program operation, a read operation or an erase operation to be used to perform a background operation, such as wear leveling, garbage collection, or read reclaim, is performed.

In accordance with an embodiment of the present disclosure, the memory controller 200 may include an accelerator controller. The memory controller 200 may control the hardware accelerator 300 using the accelerator controller.

The hardware accelerator 300 may be hardware for assisting the memory controller 200. In detail, the hardware accelerator 300 may be a component that is capable of performing some of operations performed by the memory controller 200 when processing a request from the host 2000. For example, the hardware accelerator 300 may perform an operation such as an operation of searching for map data related to user data, an operation of searching for information about mapping between a logical address and a physical address, or an operation of searching for map cache information. In accordance with an embodiment of the present disclosure, the hardware accelerator 300 may be used to assist the memory controller 200 in a read operation, and may not be used in a write operation.

The host 2000 may communicate with the storage device 1000 using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Although, in FIG. 1, the memory controller 200 and the hardware accelerator 300 are illustrated as being separated, it is apparent that a form in which the memory controller 200 includes the hardware accelerator 300, a form in which the hardware accelerator 300 is included in the memory device 100, or the like may be implemented.

Figure 2:
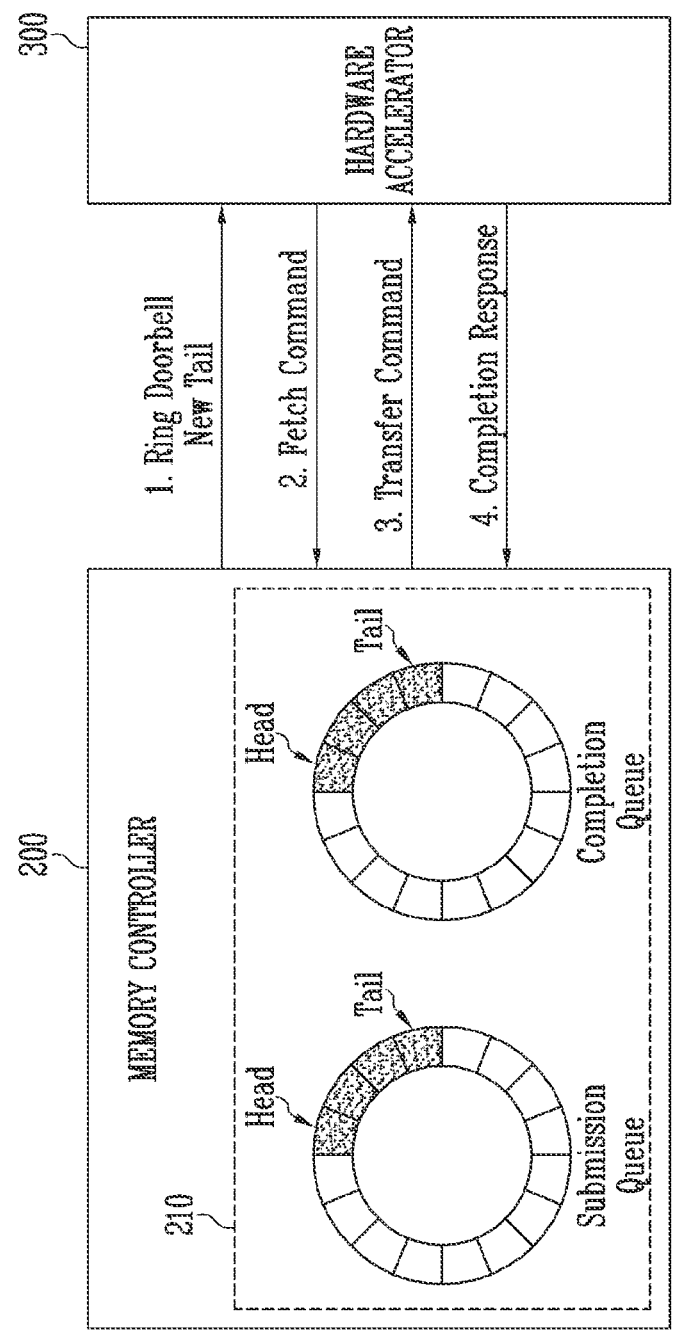
FIG. 2 is a diagram illustrating a command queue interface operation according to an embodiment of the present disclosure.

FIG. 2 is a diagram illustrating a command queue interface operation according to an embodiment of the present disclosure.

Referring to FIG. 2, the case where a memory controller 200 and a hardware accelerator 300 perform a command queue interface operation is illustrated.

The memory controller 200 may generate a queue pair including a submission queue and a completion queue. When the memory controller 200 includes a plurality of cores, the submission queue and the completion queue may be a queue pair generated to correspond to one of the plurality of cores. In an embodiment, the queue pair may be stored in an internal memory 210 of the memory controller 200.

The memory controller 200 may include a doorbell register to perform a command queue interface operation. The memory controller 200 and the hardware accelerator 300 may use a doorbell-based interface that allows the memory controller 200 to issue a pointer update write request. Here, the pointer update write request may be referred to as a 'doorbell.' The memory controller 200 may store information about the queue pair in the doorbell register. When the plurality of cores are present in the memory controller 200, a number of doorbell registers identical to the number of cores may be included in the hardware accelerator 300. Each doorbell register may store a submission queue tail pointer indicating the tail of the submission queue and a completion queue head pointer indicating the head of the completion queue. The hardware accelerator 300 may perform the command queue interface operation with the memory controller 200 by accessing the submission queue and the completion queue with reference to the doorbell register.

The memory controller 200 may queue a command in the submission queue so as to provide the command to the hardware accelerator 300. Further, the memory controller 200 may update the submission queue tail pointer, and may provide information about the updated submission queue tail pointer to the hardware accelerator 300. The hardware accelerator 300 may store the updated submission queue tail pointer in the doorbell register.

Furthermore, the hardware accelerator 300 may fetch the command stored in the submission queue. When the command is transferred from the memory controller 200 to the hardware accelerator 300, the hardware accelerator 300 may process the command received from the memory controller 200.

The hardware accelerator 300 may provide a completion response by recording that processing of the command has been completed in the completion queue after processing of the command. For example, the hardware accelerator 300 may write a completion queue entry to the completion queue. Here, the completion queue head pointer may increase.

Further, the memory controller 200 may complete the corresponding command. The memory controller 200 may provide the updated completion queue head pointer to the hardware accelerator 300. For example, the hardware accelerator 300 may store the updated completion queue head pointer in the doorbell register.

Figure 3:
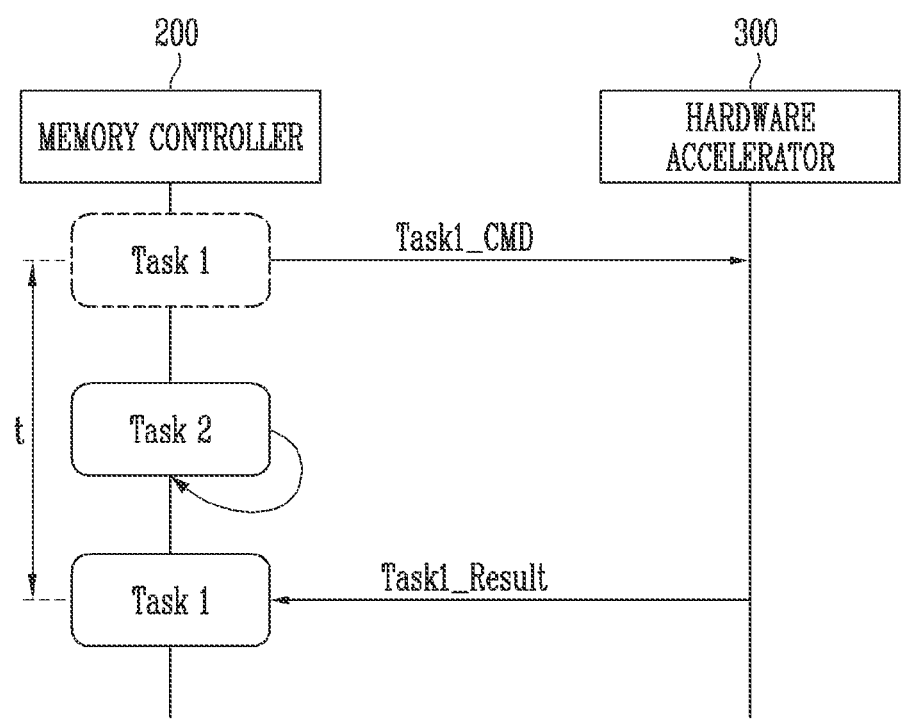
FIG. 3 is a diagram illustrating the operation of a memory controller and a hardware accelerator according to an embodiment of the present disclosure.

FIG. 3 is a diagram illustrating the operation of a memory controller and a hardware accelerator according to an embodiment of the present disclosure.

Referring to FIG. 3, the case where a second task is processed prior to a first task is illustrated.

A memory controller 200 may receive a first request from a host 2000. Further, the memory controller 200 may process a first task in response to the first request from the host 2000. In accordance with an embodiment, the first task may be a task requiring the operation of the hardware accelerator 300, and the memory controller 200 may transfer a command Task1_CMD corresponding to the first task to the hardware accelerator 300. Meanwhile, the memory controller 200 may be in an idle state until a result Task1_Result corresponding to the first task is received from the hardware accelerator 300. The memory controller 200 may perform an operation that does not require the hardware accelerator 300 during the time t in which the result is waiting to be received from the hardware accelerator 300. Here, the second task may be a task that does not require the operation of the hardware accelerator 300. For example, because the memory controller 200 may receive a second request for a write operation that is an operation of storing data in the memory device 100 from the host 2000, and the second task corresponding to the second request does not require the operation of the hardware accelerator 300, the second task may be processed during the waiting time t. In accordance with FIG. 3, the second task may be processed prior to the first task.

Figure 4:
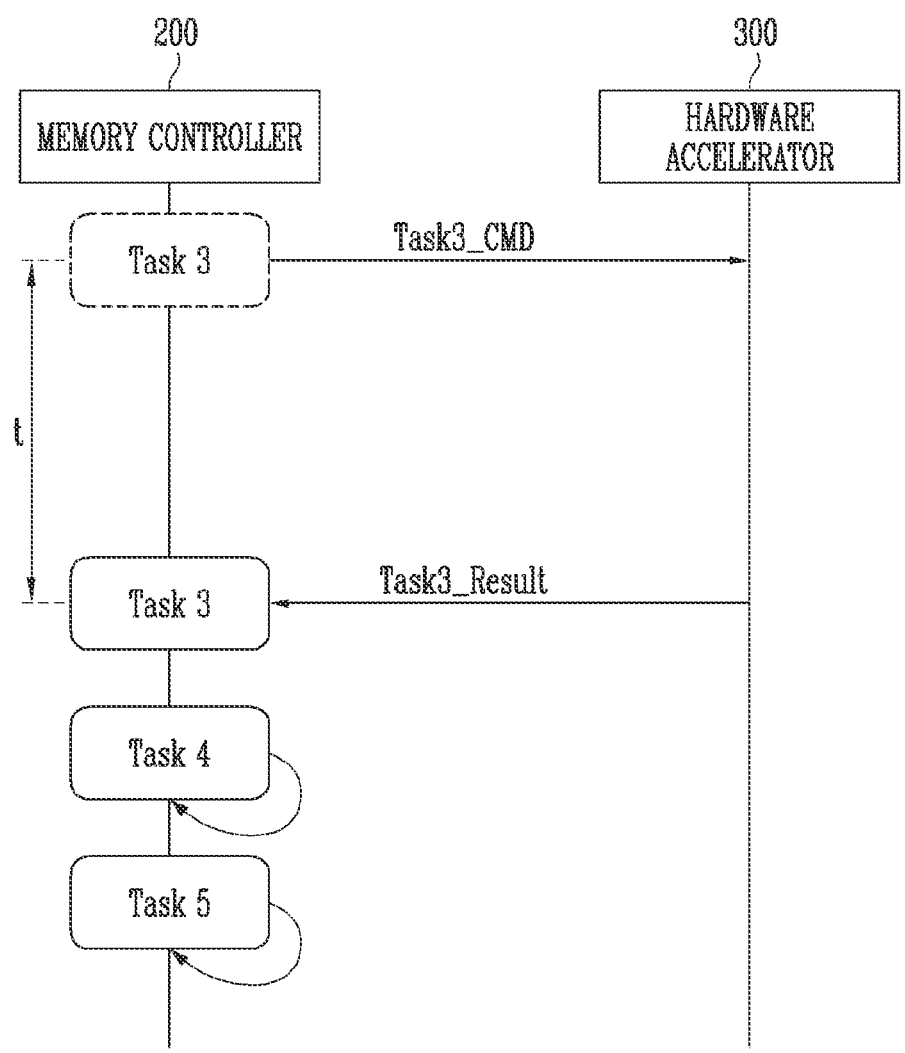
FIG. 4 is a diagram illustrating the operation of a memory controller and a hardware accelerator according to an embodiment of the present disclosure.

FIG. 4 is a diagram illustrating the operation of the memory controller and the hardware accelerator according to an embodiment of the present disclosure.

Referring to FIG. 4, the case where a third task to a fifth task are sequentially processed is illustrated.

The memory controller 200 may receive a third request from the host 2000. Further, the memory controller 200 may process a third task in response to the third request from the host 2000. Here, the third task may be a task requiring the operation of the hardware accelerator 300, and the memory controller 200 may transfer a command Task3_CMD corresponding to the third task to the hardware accelerator 300. Meanwhile, the memory controller 200 may be in an idle state until a result Task3_Result corresponding to the third task is received from the hardware accelerator 300. In order to keep the processing order of the third task and the fourth task, the memory controller 200 may stop the processing of the corresponding task during the time t in which the result is waiting to be received from the hardware accelerator 300. That is, the memory controller 200 may perform a barrier operation of preventing other tasks from being processed until the third task is processed. According to the barrier operation, the memory controller 200 cannot process the fifth task prior to the third task until the third task is processed even in the case where the fifth task may be processed prior to the third task.

Figure 5:
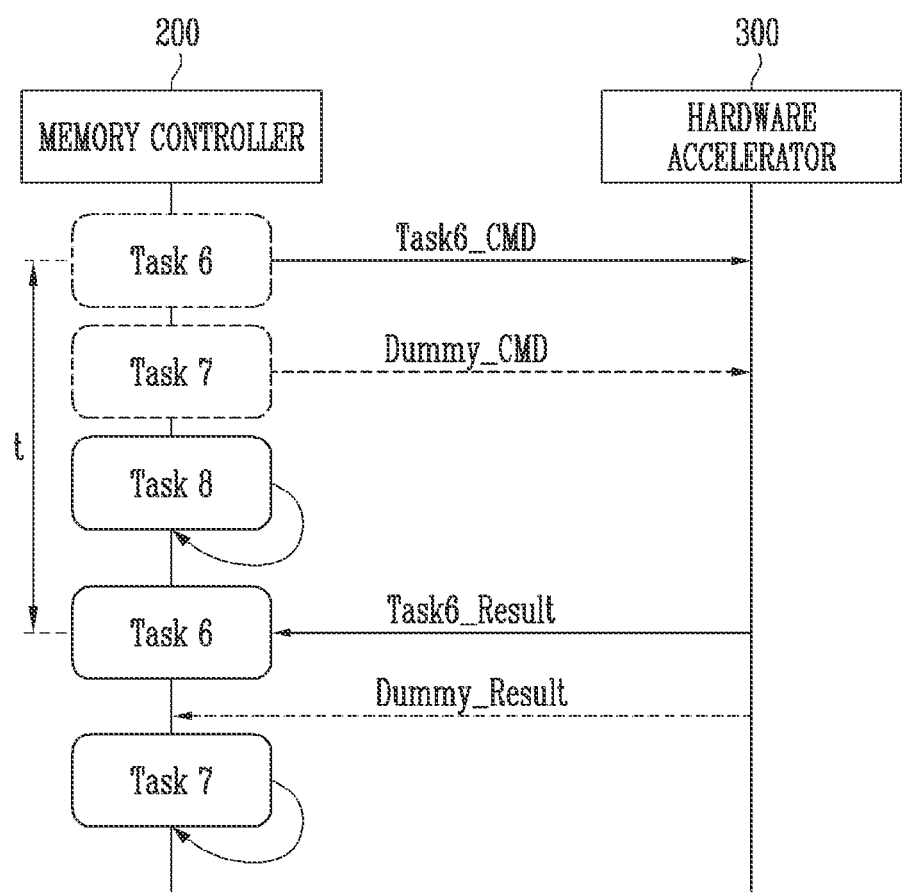
FIG. 5 is a diagram illustrating the operation of a memory controller and a hardware accelerator according to an embodiment of the present disclosure.

FIG. 5 is a diagram illustrating the operation of the memory controller and the hardware accelerator according to an embodiment of the present disclosure.

Referring to FIG. 5, the case where a sixth task to an eighth task are efficiently processed is illustrated. The memory controller 200 may sequentially receive requests corresponding to the sixth task to the eighth task from the host 2000. For example, the memory controller 200 may receive a sixth request corresponding to the sixth task, receive a seventh request corresponding to the seventh task, and finally receive an eighth request corresponding to the eighth task, from the host 2000.

Further, the memory controller 200 may process the sixth task in response to the sixth request from the host 2000. Here, the sixth task may be a task requiring the operation of the hardware accelerator 300, and the seventh task and the eighth task may be tasks that do not require the operation of the hardware accelerator 300. Furthermore, the seventh task may be a task to be processed after the sixth task is processed first.

In accordance with an embodiment of the present disclosure, the memory controller 200 may transfer a command Task6_CMD corresponding to the sixth task to the hardware accelerator 300. Furthermore, the memory controller 200 may generate a dummy command Dummy_CMD corresponding to the seventh task, and may transfer the dummy command to the hardware accelerator 300.

Meanwhile, the memory controller 200 may process the eighth task during the time t in which a result Task6_Result corresponding to the sixth task is received from the hardware accelerator 300. Because the eighth task is a task that does not require the operation of the hardware accelerator 300 and is not related to a processing order, the memory controller 200 may process the eighth task prior to the sixth task and the seventh task.

The memory controller 200 may receive a result Task6_Result corresponding to the sixth task and a result Dummy_Result corresponding to the dummy command from the hardware accelerator 300. Here, the hardware accelerator 300 may sequentially process commands in the order of reception of the commands from the memory controller 200. In an embodiment, the hardware accelerator 300 may process the command Task6_CMD corresponding to the sixth task, and may process the dummy command Dummy_CMD corresponding to the seventh task. Because the dummy command Dummy_CMD is a dummy command corresponding to the seventh task that does not require the operation of the hardware accelerator 300, the hardware accelerator 300 may not perform any operation corresponding to the dummy command Dummy_CMD, and may transmit a completion response corresponding to the dummy command Dummy_CMD, as a result Dummy_Result corresponding to the dummy command, to the memory controller 200.

In accordance with an embodiment of the present disclosure, the sixth command may be a command corresponding to a read request to request user data, and the seventh command may be a command corresponding to a write request to update the read data. In accordance with an embodiment, the processing order of the sixth task and the seventh task may be requested by the host 2000, and the memory controller 200 may determine the processing order based on information received from the host 2000.

In accordance with an embodiment, whether the operation of the hardware accelerator 300 is required may be determined in advance depending on the type of request received from the host 2000. For example, it may be determined in advance that a write request does not require the operation of the hardware accelerator 300 and that a read request requires the operation of the hardware accelerator 300. Also, the memory controller 200 may control the hardware accelerator 300 based on the predetermined information.

Figure 6:
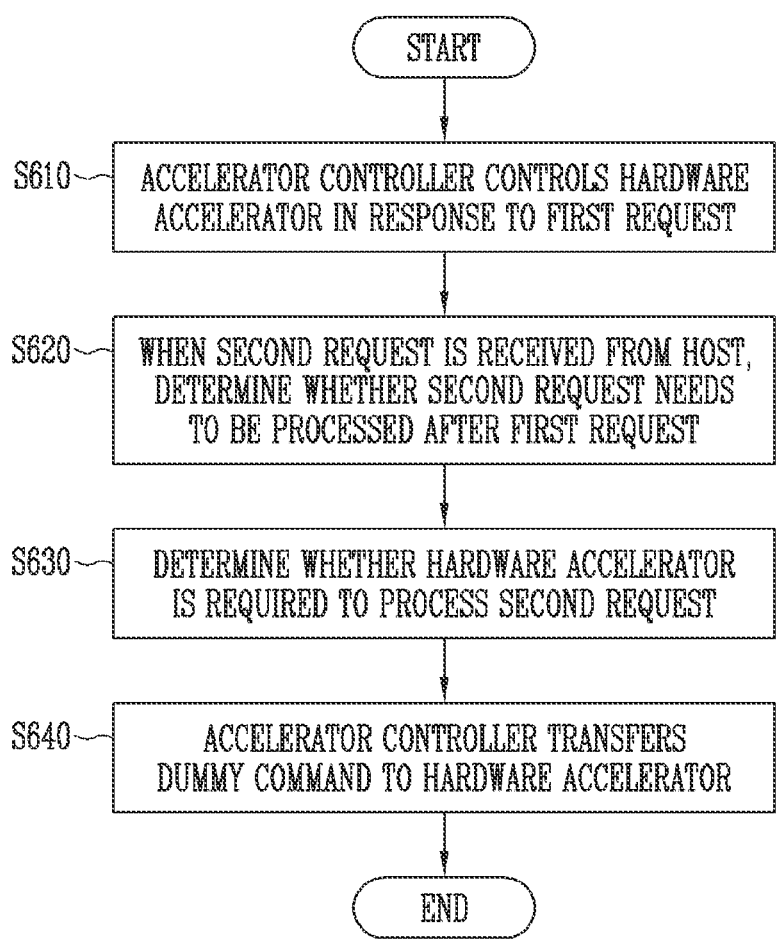
FIG. 6 is a flowchart illustrating a method of operating a memory controller according to an embodiment of the present disclosure.

FIG. 6 is a flowchart illustrating a method of operating a memory controller according to an embodiment of the present disclosure.

As described above with reference to FIG. 1, the memory controller 200 may include the accelerator controller which controls the hardware accelerator 300.

Also, the memory controller 200 may control the hardware accelerator in response to a request received from the host 2000 at operation S610. In detail, when a first request is received from the host 2000, the accelerator controller included in the memory controller 200 may control the hardware accelerator 300 in response to the first request.

Further, when a subsequent request is received from the host 2000, the memory controller 200 may determine whether an order (e.g., first-in first-out) is to be kept in a relationship with requests previously received from the host 2000. In detail, when a second request is received from the host 2000, the accelerator controller may determine whether the second request needs to be processed after the previously received first request at operation S620. For example, when the previously received first request is a read request to request user data stored in the memory device 100, and the subsequently received second request is a write request to update read user data, the accelerator controller may determine that the second request needs to be processed after processing of the first request. In this case, when the order of an operation corresponding to the first request (e.g., a read operation) and an operation corresponding to the second request (e.g., a write operation) changes, the results of output may change, and thus the processing order of the first request and the second request needs to be kept.

Furthermore, the memory controller 200 may determine whether the hardware accelerator 300 is required to process the second request at operation S630. Here, the hardware accelerator 300 may search for map data related to user data stored in the memory device 100 or information about mapping between a logical address and a physical address. When the map data or mapping information is used, the memory controller 200 may determine that the second request requires the operation of the hardware accelerator 300.

Furthermore, the memory controller 200 may transfer a dummy command to the hardware accelerator 300. In detail, when the second request needs to be processed with priority lower than that of the first request (i.e., after the first request), and does not require the operation of the hardware accelerator 300, the accelerator controller may transfer the dummy command to the hardware accelerator 300 at operation S640.

In accordance with an embodiment of the present disclosure, the hardware accelerator 300 may output a dummy command completion response to the accelerator controller in response to the dummy command received from the accelerator controller. The hardware accelerator 300 may process commands received from the accelerator controller in the order of reception of the commands. After processing the received commands before the dummy command is received, the hardware accelerator 300 may output a completion response to the dummy command to the accelerator controller.

Figure 7:
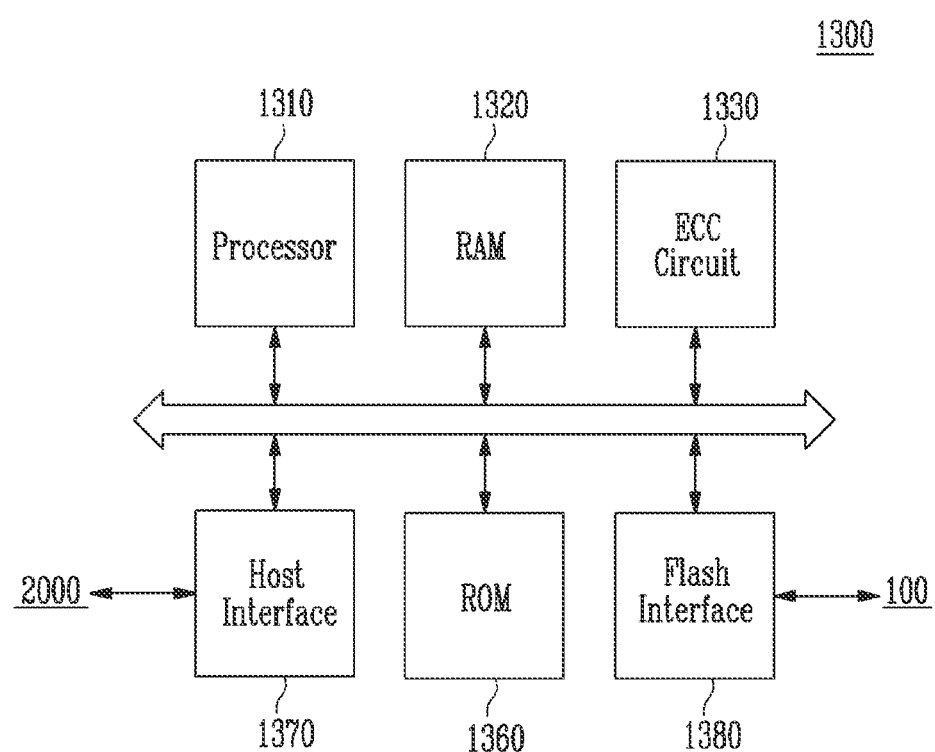
FIG. 7 is a diagram illustrating a memory controller according to an embodiment of the present disclosure.

FIG. 7 is a diagram illustrating a memory controller according to an embodiment of the present disclosure.

Referring to FIG. 7, a memory controller 1300 may include a processor 1310, a RAM 1320, an error correction circuit 1330, a ROM 1360, a host interface 1370, and a flash interface 1380. The memory controller 1300 illustrated in FIG. 7 may be an embodiment of the memory controller 200 illustrated in FIG. 1.

The processor 1310 may communicate with the host 2000 using the host interface 1370, and may perform a logical operation to control the operation of the memory controller 1300. For example, in response to requests received from a host 2000 or an external device, the processor 1310 may load a program command, a data file, a data structure, etc., and may perform various types of operations or generate commands and addresses. For example, the processor 1310 may generate various commands required for a program operation, a read operation, an erase operation, a suspend operation, and a parameter setting operation.

Also, the processor 1310 may perform a function of a flash translation layer (FTL). The processor 1310 may translate a logical block address (LBA), provided by the host 2000, into a physical block address (PBA) through the FTL. The FTL may receive the logical block address (LBA) and translate the LBA into the physical block address (PBA) using a mapping table. Examples of an address mapping method performed through the FTL may include various methods according to a mapping unit. Representative address mapping methods include a page mapping method, a block mapping method, and a hybrid mapping method.

Further, the processor 1310 may generate commands without receiving a request from the host 2000. For example, the processor 1310 may generate commands for background operations such as operations for wear leveling of the memory device 100 and operations for garbage collection of the memory device 100.

The RAM 1320 may be used as a buffer memory, a working memory or a cache memory of the processor 1310. The RAM 1320 may store codes and commands that are executed by the processor 1310. The RAM 1320 may store data that is processed by the processor 1310. In implementation of the RAM 1320, the RAM 1320 may be implemented to include a static RAM (SRAM) or a dynamic RAM (DRAM).

The error correction circuit 1330 may detect errors and correct the detected errors during a program operation or a read operation. In detail, the error correction circuit 1330 may perform an error correction operation based on error correction code (ECC). Also, the error correction circuit 1330 may perform error correction code encoding (ECC encoding) based on data to be written to the memory device 100. The ECC-encoded data may be transferred to the memory device 100 through the flash interface 1380. Further, the error correction circuit 1330 may perform error correction code decoding (ECC decoding) on data received from the memory device 100 through the flash interface 1380.

The ROM 1360 may be used as a storage unit which stores various types of information required for the operation of the memory controller 1300. In detail, the ROM 1360 may include a map table, in which physical-logical address information and logical-physical address information may be stored. Further, the ROM 1360 may be controlled by the processor 1310.

The host interface 1370 may include a protocol for performing data exchange between the host 2000 and the memory controller 1300. In an embodiment, the host interface 1370 may communicate with the host 2000 through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The flash interface 1380 may communicate with the memory device 100 using a communication protocol under the control of the processor 1310. In detail, the flash interface 1380 may transmit/receive commands, addresses, and data to/from the memory device 100 through a channel. For example, the flash interface 1380 may include a NAND interface.

Figure 8:
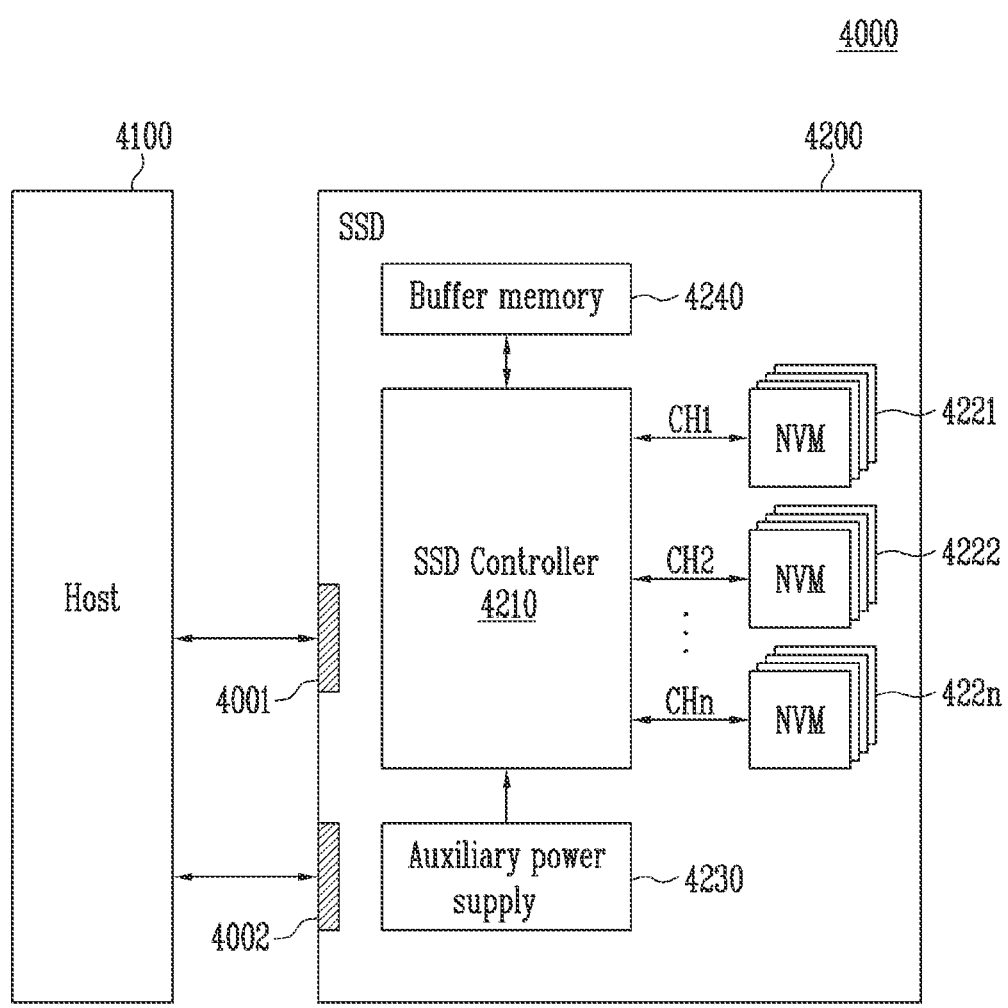
FIG. 8 is a diagram illustrating a solid state drive (SSD) system according to an embodiment of the present disclosure.

FIG. 8 is a diagram illustrating a solid state drive (SSD) system according to an embodiment of the present disclosure.

Referring to FIG. 8, an SSD system 4000 may include a host 4100 and an SSD 4200. The SSD 4200 may exchange a signal SIG with the host 4100 through a signal connector 4001, and may be supplied with power PWR through a power connector 4002. The SSD 4200 may include an SSD controller 4210, a plurality of flash memories 4221 to 422*n*, an auxiliary power supply 4230, and a buffer memory 4240.

In an embodiment, the SSD controller 4210 may perform a function of the memory controller 200, described above with reference to FIG. 1. The SSD controller 4210 may control the plurality of flash memories 4221 to 422*n* in response to the signal SIG received from the host 4100. In an embodiment, the signal SIG may include signals based on the interfaces of the host 4100 and the SSD 4200. For example, the signal SIG may be a signal defined by at least one of various communication standards or interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) interfaces.

The auxiliary power supply 4230 may be coupled to the host 4100 through the power connector 4002. The auxiliary power supply 4230 may be supplied with power PWR from the host 4100, and may be charged. The auxiliary power supply 4230 may supply the power of the SSD 4200 when the supply of power from the host 4100 is not smoothly performed. In an embodiment, the auxiliary power supply 4230 may be located inside the SSD 4200 or located outside the SSD 4200. For example, the auxiliary power supply 4230 may be located in a main board, and may also provide auxiliary power to the SSD 4200.

The buffer memory 4240 may function as a buffer memory of the SSD 4200. For example, the buffer memory 4240 may temporarily store data received from the host 4100 or data received from the plurality of flash memories 4221 to 422*n*, or may temporarily store metadata (e.g., mapping tables) of the flash memories 4221 to 422*n*. The buffer memory 4240 may include volatile memories, such as DRAM, SDRAM, DDR SDRAM, LPDDR SDRAM, and GRAM, or nonvolatile memories, such as FRAM, ReRAM, STT-MRAM, and PRAM.

In accordance with the present disclosure, there are provided a method of efficiently operating a storage device including a hardware accelerator and a controller that are asynchronously operated.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
a memory device including a plurality of memory cell arrays configured to store user data;
a hardware accelerator configured to search for map data related to the user data; and
a memory controller configured to:
sequentially receive a first request and a second request from a host,
transfer a first command corresponding to the first request to the hardware accelerator to perform an operation corresponding to the first command, and
transfer a dummy command corresponding to the second request to the hardware accelerator,
wherein the hardware accelerator is further configured to:
provide the memory controller with a completion response corresponding to the first command by performing the operation corresponding to the first command, and
provide the memory controller with a dummy command completion response corresponding to the dummy command without performing an operation corresponding to the dummy command, after providing the memory controller with the completion response corresponding to the first command.

2. The storage device according to claim 1, wherein the memory controller is configured to transfer the dummy command to the hardware accelerator when the second request is received after the first request and needs to be processed later than the first request.

3. The storage device according to claim 2, wherein the memory controller is configured to transfer the dummy command to the hardware accelerator when the second request does not require an operation of the hardware accelerator.

4. The storage device according to claim 2,
wherein the first request is a read request to request the user data, and
wherein the second request is a write request to update the user data.

5. The storage device according to claim 1, wherein the hardware accelerator is further configured to output the dummy command completion response to the memory controller in response to the dummy command received from the memory controller.

6. The storage device according to claim 1, wherein the hardware accelerator is further configured to process commands received from the memory controller in an order of reception of the commands.

7. A memory controller comprising:
a hardware accelerator configured to search for information about mapping between a logical address and a physical address; and
an accelerator controller configured to:
sequentially receive a first request and a second request from a host,
transfer a first command corresponding to the first request to the hardware accelerator to perform an operation corresponding to the first command, and
transfer a dummy command corresponding to the second request to the hardware accelerator,
wherein the hardware accelerator is further configured to:
provide the accelerator controller with a completion response corresponding to the first command by performing the operation corresponding to the first command, and
provide the accelerator controller with a dummy command completion response corresponding to the dummy command without performing an operation corresponding to the dummy command, after providing the accelerator controller with the completion response corresponding to the first command.

8. The memory controller according to claim 7, wherein the second request is received after the first request and needs to be processed later than the first request.

9. The memory controller according to claim 8, wherein the second request does not require an operation of the hardware accelerator.

10. The memory controller according to claim 8, wherein the first request is a read request to request user data stored in a memory device, and
wherein the second request is a write request to update the user data.

11. The memory controller according to claim 7, wherein the hardware accelerator is further configured to output the dummy command completion response to the accelerator controller in response to the dummy command received from the accelerator controller.

12. The memory controller according to claim 7, wherein the hardware accelerator is further configured to process commands received from the accelerator controller in an order of reception of the commands.

13. A method of operating a storage device including a hardware accelerator and an accelerator controller, the method comprising:
sequentially receiving, by the accelerator controller, a first request and a second request from a host;
transferring, by the accelerator controller, a first command corresponding to the first request to the hardware accelerator to perform an operation corresponding to the first command;
transferring, by the accelerator controller, a dummy command corresponding to the second request to the hardware accelerator;
providing, by the hardware accelerator, the accelerator controller with a completion response corresponding to the first command by performing the operation corresponding to the first command; and
providing, by the hardware accelerator, the accelerator controller with a dummy command completion response corresponding to the dummy command without performing an operation corresponding to the dummy command.

14. The method according to claim 13, wherein the dummy command is transferred to the hardware accelerator when the second request is received after the first request and needs to be processed later than the first request.

15. The method according to claim 13, wherein the dummy command is transferred to the hardware accelerator when the second request does not require an operation of the hardware accelerator.

16. The method according to claim 13,
wherein the first request is a read request to request user data stored in a memory device, and
wherein the second request is a write request to update the user data.

17. The method according to claim 13, wherein the providing of the accelerator controller with the dummy command completion response comprises outputting, by the hardware accelerator, the dummy command completion response to the accelerator controller in response to the dummy command received from the accelerator controller.

18. A device comprising:
an accelerator configured to provide responses sequentially in response to a series of respective acceleration commands by completing actual acceleration tasks for one or more actual acceleration commands within the series and without performing a dummy acceleration task for a dummy acceleration command within the series; and
a controller configured to process sequentially a series of controller tasks, which include the actual and dummy acceleration tasks and self-tasks, by:
providing the accelerator with the series of respective acceleration commands to receive the responses,
completing the self-tasks, and
completing the dummy acceleration task upon receiving the response to the dummy acceleration command.

* * * * *